United States Patent Office 3,057,783

Patented Oct. 9, 1962

1

3,057,783
INFECTIOUS BOVINE RHINOTRACHEITIS VACCINE AND METHOD OF PREPARING IT

Victor Jack Cabasso, Pearl River, N.Y., assignor to American Cyanamid Company, New York, N.Y., a corporation of Maine No Drawing. Filed Dec. 16, 1960, Ser. No. 76,127
4 Claims. (Cl. 167—78)

This invention relates to a modified infectious bovine rhinotracheitis virus which is avirulent to cattle even when introduced intranasally and which can, therefore, be used as a vaccine. More particularly the invention relates to a process of producing such avirulent virus involving alternate passages through bovine tissue and through tissue cultures of human cancer cells outside of the human body.

Infectious bovine rhinotracheitis is a virus disease involving the respiratory tract of cattle. The immunization of cattle against this disease constitutes a veterinary problem of substantial economic importance. The problem is to produce a modified or attenuated strain of the virus which on intranasal injection immunize cattle against the disease.

The present invention produces a modified or avirulent virus which may be used as a vaccine by a process in which the virus is alternately passed through bovine tissue, preferably embryonic bovine tissue, and cancer cells of human origin outside of the human body such as, for example, cultures of HeLa cells. After a sufficient number of passages, preferably at least five, the virus becomes modified or attenuated so that it will grow either in the bovine tissue cells or in human cancer cells outside of the human body.

The process of the present invention depends on the successive alternations of passage for the virus at the start will not continuously grow in human cancer cells nor will continuous growth in bovine tissue modify the virus so that it will continuously grow in cancer cells. This is clearly brought out by the article by Madin in Science, volume 124, pages 721–722. The author grew virus in beef embryo kidney tissue and then determined that the virus so grown would not continue to grow in cancer cells. The author states that subpassages in other bovine tissue could be made but " . . . never in HeLa cells, KB cells, L cells, or chick fibroblasts." The present invention rests on the surprising discovery that while the virus after the first bovine passage will not continuously grow in human cancer cells it will grow for a short time and if promptly alternated after a sufficient number of alternate passages the virus becomes adapted to grow continuously in human cancer cells in vitro and is cytopathogenic thereto.

In developing the modified IBR virus of the present invention, frozen lung tissue obtained from a calf which had been experimentally infected with the disease was obtained from the Veterinary Virus Research Institute of Cornell University, Ithaca, New York. The tissue was thawed, ground in a Tenbroeck grinder to a 20 percent suspension in a phosphate buffered solution, pH 7.2 to 7.4, and then centrifuged at 2000 revolutions per minute for twenty minutes. Quantities of the supernatant solution were inoculated into tissue culture tubes as described below.

Embryonic bovine tissue was used to prepare tissue culture tubes of lung tissue and skin-muscle tissue. These were prepared by the method of Dulbecco and Vogt, Journal of Experimental Medicine, 99, page 167, 1954. The growth medium consisted of Earle's basal medium (Journal of the National Cancer Institute, 4, page 165, 1943), containing 20 percent normal calf serum and lactalbumin hydrolysate (Melnick and Riordan, Proceedings of the Society of Experimental Biology and Medicine, 81, page 208, 1952). After the tissue had grown for five days, the tubes were renewed with Medium 199 (Morgan, Morton and Parker, Proceedings of the Society of Experimental Biology and Medicine, 73, page 1, 1950), and each of the above-described tissue culture tubes was inoculated with one-tenth milliliter of the supernatant virus suspension described above and the tubes incubated in a stationary position at 37° C. On the third day, a cytopathogenic action was observed, the tissue cells being destroyed by the growing virus. At this time, the supernatant solution was withdrawn and used to inoculate further tubes of growing tissue in series and finally in the studies described below.

After the IBR virus of the Ithaca strain was established in bovine tissue from the frozen lung, it was used to inoculate stationary tubes in which HeLa cancer cells, obtained from a cancer of the cervix, were being cultivated. These HeLa cells were cultivated in Eagle's basal medium (Journal of Experimental Medicine, volume 102, page 595, 1955), containing 20 percent inactivated horse serum in stationary tubes. In early passages, HeLa cultures were renewed with Eagle's basal medium containing 5 percent chicken serum. Later, Ginsberg's medium (Ginsberg, Gold, and Jordan, Proceedings of the Society of Experimental Biology and Medicine, 1955, volume 89, page 66), was substituted throughout, save for a few serial passages which were renewed with Eagle's medium containing 5 percent cow serum. Cultures were consistently renewed with 1 milliliter fluid and were uniformly infected with 0.2 milliliter bovine or HeLa cell tissue culture fluids. Tubes were observed daily until the cytopathogenic effect was complete in infected tubes but for not more than seven days. Harvested cells and fluids were ground in a Tenbroeck grinder and either subcultured on the same day or stored in the dry ice chest for future use. Titrations were made in either bovine embryo kidney or HeLa cell cultures using 0.2 milliliter of each ten-fold serial dilution in two or three tissue culture tubes. The TC–$ID_{50}$ titers were calculated by the Reed-Muench formula (Reed and Menuch, American Journal of Hygiene, volume 27, page 493).

Upon the very first HeLa passage, the cells rounded and clumped up within twenty-four hours and by the third day had all fallen off the glass. In the second HeLa passage, however, very little change was observed in four days although virus was readily recovered by sub-inoculation into bovine kidney. A third straight transfer showed no cellular alteration whatever in seven days and was discarded.

These results showed that the IBR virus was not growing in the HeLa cells. Accordingly, a tissue culture tube in which bovine kidney was growing was inoculated with material from the second HeLa cell tissue culture and allowed to develop therein. After two to three days, tissue culture fluid was removed from this bovine kidney passage and used to inoculate tissue culture tubes containing growing HeLa cells as before. After three more serial passages in HeLa tissue culture tubes, it was again used to inoculate bovine kidney culture tubes as before.

The alternate passage of the IBR virus from bovine tissue culture to HeLa tissue culture was continued for a total of ten alternations at which time it was observed that the IBR virus was developing a cytopathogenic action on the second passage in HeLa cells, thus indicating that it was being modified and was adapting itself to grow on these human cancer cells. Once adapted, the virus maintained the fast destructive action it exerted on the cells of the first HeLa passage and yielded titers comparable to those of the virus when grown in bovine kidney. Once having been adapted to grow in HeLa cells, the IBR virus was propagated serially therein for more than fifty serial passages without loss of its cytopathogenic action.

It was also observed that the virus retained its capacity to develop protective IBR antibodies when calves were inoculated by either the intramuscular or intranasal route. This modified virus can, therefore, be used as a vaccinating agent for bovines against infection with the IBR virus. The vaccination may consist simply of spraying a few milliliters of the tissue culture fluid containing the modified virus into a nostril of a bovine or by injecting the animal intramuscularly with a quantity of the tissue culture fluid containing 100 or more $TC-ID_{50}$.

As stated above, the IBR virus was adapted to grow in HeLa cancer cells after about ten alternating passages in embryonic bovine tissue. The IBR virus after being adapted to grow in HeLa cells was then used to inoculate tissue cultures of other carcinomas. For instance, fluid from the forty-second consecutive HeLa tissue culture was used to inoculate tissue culture tubes in which cells of a human carcinoma taken from the floor of the mouth described by Eagle as KB cells, Proceedings of the Society of Experimental Biology and Medicine, 1955, volume 89, page 362. Although the virus exhibited a cytopathogenic action at first, it was found that it was not fully adapted to grow in these KB cells. Accordingly, fluid from the first KB tissue culture was used to inoculate tissue culture tubes containing HeLa cells. After two alternating passages from tissue cultures of KB cells to HeLa cells, the virus became adapted to propagate serially in the KB cells and exerted the same type of cytopathogenic action thereon as it did on the HeLa cells.

Similarly, H. Ep. No. 1 human carcinoma cells of the cervix as described by H. W. Toolan, Cancer Research, 1953, volume 13, page 389, were used on which to propagate the HeLa modified IBR virus. The virus was found to grow on these H. Ep. cells without alternation.

Further details of the process of modifying the infectious bovine rhinotracheitis virus so that it will grow in human cancer cells and of the immunizing properties of the modified virus can be found in a paper published in the Proceedings of the Society for Experimental Biology and Medicine, 1957, volume 95, pages 471–476, Infectious Bovine Rhinotracheitis (IBR). I. Propagation of Virus in Cancer Cells of Human Origin (HeLa), by the present applicant and coworkers.

This application is a continuation-in-part of my copending application Serial No. 732,459, filed May 2, 1958, now abandoned.

I claim:

1. A process of modifying the viral agent of infectious bovine rhinotracheitis so that it is avirulent to cattle and so that it will propagate in cancer cells in vitro and exert a cytopathogenic effect thereon which comprises the steps of inoculating tissue cultures containing growing cancer cell tissue with infections bovine rhinotracheitis virus and after evidence of a cytopathogenic effect is noted on said cells, removing a quantity of the culture fluid and inoculating tissue cultures containing growing bovine tissue and after a period of growth in said bovine tissue, recovering tissue culture fluid therefrom and inoculating cancer cell tissue cultures therewith and continuing said alternating passage from human tissue cultures to bovine tissue cultures until the virus has been modified so that it will continue to grow in successive cancer cell tissue cultures and continuing said passages until the infectious bovine rhinotracheitis virus has been modified to be cytopathogenic for human cancer cells in vitro.

2. A process in accordance with claim 1 in which the cancer cells are human carcinoma cells.

3. A process in accordance with claim 1 in which the desired cytopathogenic effect for cancer cells is achieved by at least five alternating passages from bovine tissue to human tissue.

4. A vaccine effective in immunizing cattle against infectious bovine rhinotracheitis disease which is capable of continuous growth in human cancer cells in vitro and is avirulent to cattle on intranasal injection but on such injection is capable of developing immunizing antibodies against virulent infectious bovine rhinotracheitis virus, said vaccine being produced by the process of claim 1.

References Cited in the file of this patent

York: 6th Ann. Meeting of U.S. Livestock Sanitary Ass'n., November 28–30, 1956, pages 149–154.

Madin: Science, vol. 124, Oct. 19, 1956, pages 721–722.

Love: J. of Nat'l. Cancer Inst., vol. 19, No. 1, July 1957.